March 28, 1967  H. E. TEAL  3,311,907
SOLID STATE OVER-VOLTAGE AND UNDER-VOLTAGE DETECTOR
Filed June 8, 1964  2 Sheets-Sheet 1

INVENTOR.
HUGH E. TEAL

INVENTOR.
HUGH E. TEAL

3,311,907
SOLID STATE OVER-VOLTAGE AND UNDER-VOLTAGE DETECTOR

Hugh E. Teal, Niagara Falls, N.Y., assignor, by mesne assignments, to the United States of America as represented by the Secretary of the Navy
Filed June 8, 1964, Ser. No. 373,593
3 Claims. (Cl. 340—248)

This invention relates to an overvoltage and/or undervoltage responsive circuit for a plurality of direct current supply voltages.

A supply voltage for operating relays, communication devices, control circuits and the like must be within tolerance limits dictated by the operating characteristics of the electrical apparatus connected to the supply voltage. Therefore it is important when the supply voltage drifts outside the tolerance limits that this be brought to the attention of an operator.

An object of this invention is to provide a simple, compact, efficient, reliable, comparatively low cost circuit for monitoring a plurality of direct current supply voltages for deviation of one of the supply voltages from the predetermined proper level in excess of the tolerances for that voltage.

A further object is to monitor the output voltage of a direct current dual power supply having positive and negative polarities.

A further object is to monitor the output voltage of a direct current dual power supply for deviation beyond prescribed overvoltage and undervoltage limits.

Other objects and advantages will appear from the following description of an example of the invention, and the novel features will be particularly pointed out in the appended claims.

Figure 1:
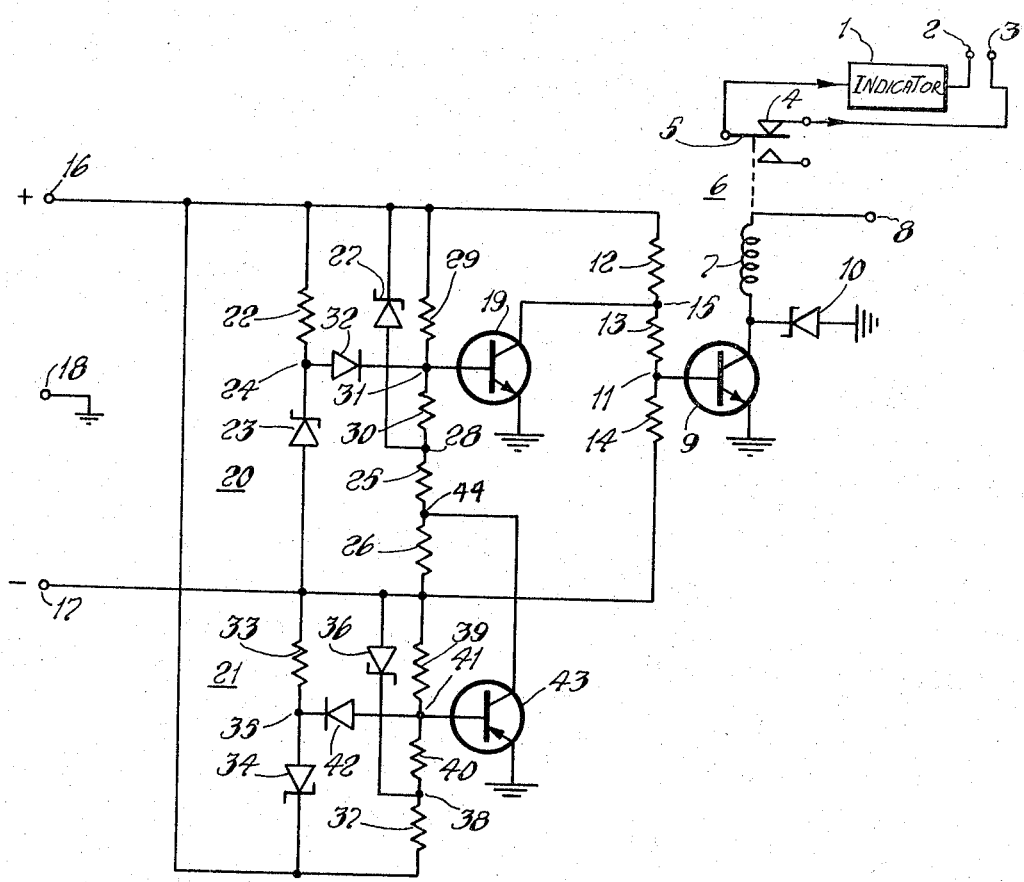
Figure 2:
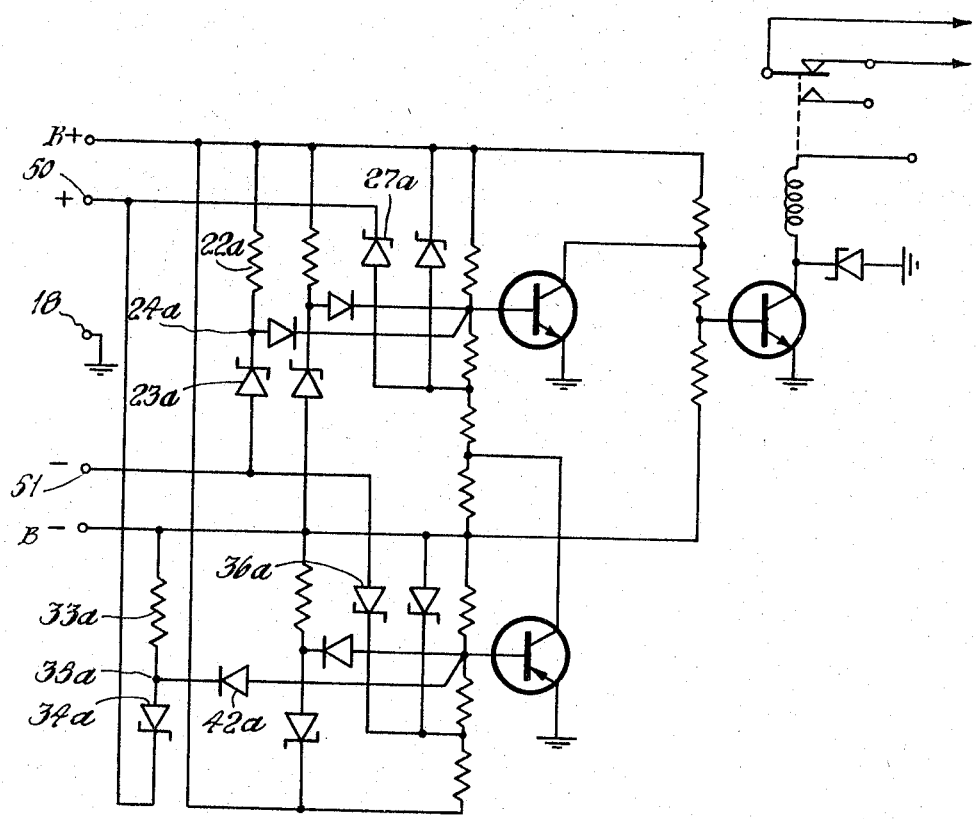

FIG. 1 is a schematic circuit diagram of an embodiment of this invention for monitoring a negative and a positive direct current supply voltage for undervoltage and overvoltage beyond prescribed limits, and FIG. 2 is a modification of the embodiment shown in FIG. 1 for monitoring more than two supply voltages.

In FIG. 1, there is shown an indicator device 1 for indicating the occurrence of either overvoltage or undervoltage in either one of two direct current supply voltages. The term indicator herein may include a lamp, meter or other suitable device. The indicator is in series with supply terminals 2 and 3 and contacts 4 and 5 of a relay 6 having a coil 7. The relay coil 7 is in series with supply terminal 8 and with the collector of an NPN transistor 9. The emitter of transistor 9 is connected to the circuit chassis or common reference potential indicated by the conventional symbol for ground. A zener diode 10 is connected between the collector and ground to protect the transistor from excessive voltage transients that may occur in the collector supply line. The base of transistor 9 is connected to tap 11 along a voltage dividing resistance including resistances 12, 13 and 14 and another tap 15 between resistances 12 and 13. The voltage divider is connected to terminals 16 and 17 for two direct current supply voltages to be monitored. The negative line of one supply and the positive line of the other supply, not shown, are connected to circuit ground terminal 18 and the other lines of the respective supplies are connected to terminals 16 and 17. The relationship of the resistance 14 to the sum of the resistances 12 and 13 is selected with reference to the normal levels of the supply voltages applied to terminals 16 and 17 whereby the tap 11 is sufficiently above ground when no current is drawn off from tap 15 for saturation of transistor 9. Under this condition, the relay 6 is energized and the contacts 4 and 5 are separated. If the collector current of transistor 9 drops sufficiently, the relay 6 is deenergized and the indicator 1 is energized.

An NPN transistor 19 has its collector connected to tap 15 and its emitter connected to ground. When the base voltage is sufficiently negative, no current is shunted thereby from tap 15 to ground. If the voltage on the base of the transistor 19 is elevated sufficiently for the transistor 19 to saturate, the latter shunts tap 15 to ground removing the positive base drive from the transistor 9 causing it to be cut off and the relay 6 to be deenergized.

Circuit portion 20 is operative in response to overvoltage on terminal 16 or undervoltage on terminal 17, exceeding the selected tolerance, to raise the voltage on the base of transistor 19 sufficiently for it to saturate.

Circuit portion 21 is operative in response to undervoltage on terminal 16 or overvoltage on terminal 17, exceeding the selected tolerance, to raise the voltage on the base of transistor 19 sufficiently for it to saturate.

Circuit portion 20 includes a resistor 22 connected at one end to terminal 16 and a zener diode 23 connected between the other end of resistor 22 and the negative terminal 17. The zener diode 23 is connected in a direction to maintain junction 24 at a constant voltage differential above the supply voltage on terminal 17, provided the voltage difference between terminals 16 and 17 is no less than the voltage rating of the zener diode 23. The voltage on junction 24 follows changes in the supply voltage on terminal 17 but does not reflect changes in the voltage on terminal 16.

Two series-connected resistors 25 and 26 are connected to terminal 17 and a zener diode 27 is connected between the series-connected resistors 25 and 26 and terminal 16. The zener diode 27 is connected in a direction to maintain junction 28 at a constant voltage differential below the supply voltage on terminal 16, provided the voltage difference between terminals 16 and 17 is no less than the voltage rating of zener diode 27. The voltage on junction 28 follows changes in the supply voltage on terminal 16 but does not reflect any changes in the supply voltage on terminal 17. A pair of series-connected resistors 29 and 30 joined at junction 31 are connected across the zener diode 27. The resistance 30 is small compared to resistance 29, e.g. less than 5% thereof. A diode 32 is connected between junction 24 and 31 to permit current flow only when junction 24 is positive relative to junction 31 by an amount in excess of the voltage drop in diode 32.

When the supply voltage on terminal 16 is higher that the normal supply voltage plus the overvoltage tolerance or when the supply voltage on terminal 17 is lower than the normal supply voltage minus the undervoltage tolerance, the voltage at tap 31 is raised sufficiently to cause saturation of the transistor 19.

Circuit portion 21 includes a resistor 33 connected at one end to terminal 17 and a zener diode is connected between the other end of resistor 33 and the positive terminal 16. The zener diode 34 is connected in a direction to maintain junction 35 at a constant voltage differential below supply voltage on terminal 16 provided the voltage difference between the terminals 16 and 17 is no less than the voltage rating of zener diode 34. The voltage on junction 35 follows changes in the supply voltage on terminal 16 but does not reflect changes in the voltage on terminal 17.

A zener diode 36 is connected at one end to terminal 17 and a resistor 37 is connected between the other end of zener diode 36 and terminal 16. The zener diode 37 operates to maintain junction 38 at a constant voltage differential below the supply voltage on terminal 17 provided the voltage difference between terminals 16 and 17 is no less than the voltage rating of zener diode 36. The voltage on junction 38 follows changes in the supply voltage on terminal 17 but does not reflect changes in the supply voltage on terminal 16. A pair of series-connected resistors 39 and 40 joined at junction 41 are connected across the zener diode 36. A diode 42 is connected between the junctions 35 and 41 to permit current flow only when the junction 41 is positive relative to the junction 35 by an amount in excess of the voltage drop in diode 42. A PNP transistor 43 has its emitter connected to ground, its base connected to junction 41 and its collector connected to the junction 44.

If the potential of junction 41 is raised above ground sufficiently the transistor 43 saturates and the tap 44 is raised to ground potential, whereby the zener diode 27 is rendered ineffective, and the tap 31 raised above ground sufficiently to saturate transistor 19.

The choice of commercial voltage rating of zener diode 23 is determined by subtracting from the minimum acceptable supply voltage on terminal 17 the sum of the voltage required at tap 31 for saturation of transistor 19 and the voltage drop in diode 32 when conducting. The choice of commercial voltage rating of zener diode 27 is determined by subtracting from the maximum acceptable supply voltage on terminal 16, the voltage required at tap 31 for saturation of transistor 19 less the voltage drop in resistor 30.

The choice of commercial voltage rating of zener diode 36 is determined by subtracting from the maximum acceptable supply voltage on terminal 17 the voltage required on tap 41 for saturating transistor 43 less the voltage drop in resistor 40.

The choice of commercial voltage rating of zener diode 34 is determined by subtracting from the minimum acceptable supply voltage on terminal 16, the voltage required on tap 41 for saturating transistor 43 plus the drop in transistor 42 when conducting.

The sum of the resistances 25, 26, 29, 30 and the sum of the resistances 37, 39, 40 are sufficiently high to draw essentially negligible current from the terminals 16 and 17 but not so high as to interfere with saturation of the transistors 19 and 43. The purpose of diode 32 is to block flow of current when the voltage of tap 31 exceeds the voltage of junction 24 (e.g. overvoltage on terminal 17) whereby voltage rise at junction 28 appears at tap 31. Similarly, the purpose of diode 42 is to block flow of current when the voltage of junction 35 exceeds the voltage on tap 41 (e.g. overvoltage on terminal 16) whereby voltage drop at junction 38 appears at tap 41.

The following components may be used in the circuit shown in FIG. 1 for monitoring 22 volt supply voltages of opposite polarities on terminals 16 and 17 where the outside limits for each supply voltage are 20 and 24 volts, and where the relay supply voltage is 28 volts.

Transistors:
- 9 _____ 2N597
- 19 _____ 2N597
- 43 _____ 2N1134

Zener diodes: Volts
- 10 _____ 35
- 23 _____ 21
- 27 _____ 24
- 34 _____ 21
- 36 _____ 24

Resistors:
- 12 _____ 18K
- 13 _____ 2K
- 14 _____ 22K
- 22 _____ 2.2K
- 25 _____ 10K
- 26 _____ 1K
- 29 _____ 18K
- 30 _____ .47K
- 33 _____ 2.2K
- 37 _____ 12K
- 39 _____ 18K
- 40 _____ .47K The zener diode available in a wide variety of ratings, is described in Zener Diode Handbook of the International Rectifier Corporation, 1960, and is used in the above described circuit to develop a constant voltage thereacross for a substantial range of current therethrough.

Any level of direct current voltage may be monitored by choosing the appropriate zener diode network. Also, more than two supply voltages may be monitored by this invention. The circuit shown in FIG. 2 may be used for monitoring up to four supply voltages and is illustrative of the technique for adopting the invention to any number of supply voltages. Each of the additional supply voltages monitored may be of either polarity. The circuit in FIG. 2 includes an additional positive supply voltage terminal 50 and an additional negative supply voltage terminal 51 and circuit components corresponding to those already described but having the ratings or values appropriate to the voltage which these component are to monitor and identified by reference characters including the corresponding number followed by an *a*.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. A circuit for monitoring a positive supply voltage for overvoltage and a negative supply voltage for undervoltage where the two supply voltages have a common reference potential comprising
    (a) a terminal for the common reference potential and a terminal for each of the supply voltages,
    (b) undervoltage responsive means for the supply voltage of negative polarity including a first resistance connected at one end to the positive terminal and a first zener diode connected between the other end of the resistance and the negative terminal for holding the injunction between the first resistance and the first zener diode at a constant potential lower than the supply voltage on the negative terminal,
    (c) overvoltage responsive means for the supply voltage of positive polarity including a second resistance connected at one end to the negative terminal and a second zener diode connected between the other end of the second resistance and the positive terminal for holding the junction between the second resistance and second zener diode at a constant potential below the supply voltage on the positive terminal,
    (d) a voltage divider connected across the second zener diode and having an output tap for providing a potential that is higher than the potential at the junction of the second zener diode and resistance by a small fraction of the potential across the second zener diode, and
    (e) a diode between the output tap and the junction between the first resistance and the first zener diode for permitting current flow therethrough when there is predetermined undervoltage on the negative terminal,
    (f) whereby predetermined overvoltage on the positive terminal and predetermined undervoltage on the negative terminal causes sufficient voltage rise at the output tap for the use in operating an indicator.

2. A circuit for monitoring a positive supply voltage for undervoltage and a negative supply voltage for overvoltage where the two supply voltages have a common reference potential comprising
    (a) a terminal for the common reference potential and a terminal for each of the supply voltages,
    (b) undervoltage responsive means for the supply voltage of positive polarity including a first resistance connected at one end to the negative terminal and a first zener diode connected between the other end of the resistance and the positive terminal for holding the junction between the resistance and zener at a constant potential below the supply voltage on the positive terminal, (c) overvoltage responsive means for the supply voltage of negative polarity including a second resistance connected at one end to the positive terminal and a second zener diode connected between the other end of the second resistance and the negative terminal for holding the junction between the second resistance and second zener diode at a constant potential greater than the supply voltage on the negative terminal, (d) a voltage divider connected across the second zener diode and having an output tap for providing a potential that is higher than the junction of the second zener diode and resistance by a small fraction of the potential across the second zener diode, and (e) a diode between the output tap and the junction between the first resistance and zener diode for permitting current flow therethrough when there is predetermined undervoltage on the positive terminal, (f) whereby predetermined overvoltage on the negative terminal and predetermined undervoltage on the positive terminal causes sufficient voltage decrease at the output tap for use in operating an indicator.

3. A circuit for monitoring a positive supply voltage and a negative supply voltage for approximately two volts undervoltage and overvoltage relative to selected normal levels, where the two supply voltages have a common reference potential comprising (a) a terminal for the common reference potential and a terminal for each of the supply voltages, (b) undervoltage responsive means for the supply voltage of negative polarity including a first resistance connected at one end to the positive terminal and a first zener diode having a voltage rating on the order of one volt less than the normal level of supply voltage on the negative terminal for holding the junction between the first resistance and the first zener diode at a constant potential difference in the positive direction relative to the supply voltage on the negative terminal, (c) undervoltage responsive means for the supply voltage of positive polarity including a second resistance connected at one end to the negative terminal and a zener diode having a voltage rating on the order of one volt less than the normal level of supply voltage on the positive terminal for holding the junction between the second resistance and the second zener diode at a constant potential difference in the positive direction relative to the supply voltage on the positive terminal, (d) overvoltage responsive means for the supply voltage of positive polarity including a third resistance connected at one end to the negative terminal and a third zener diode, having a voltage rating on the order of two volts more than the normal level of supply voltage on the positive terminal, connected between the other end of the third resistance and the positive terminal for holding the junction between the third resistance and the third zener diode at a constant potential difference in the negative direction relative to the supply voltage on the positive terminal, (e) a first voltage divider connected across the third zener diode and having a tap which is less than one volt negative when normal level supply voltages are on the supply voltage terminals, (f) an NPN transistor having its emitter connected to the reference terminal and its base connected to the tap on the first voltage divider, (g) a second voltage divider connected across said supply voltage terminals and having a positive voltage tap connected to the collector of said transistor whereby the transistor is essentially saturated when the positive supply voltage exceeds the normal level by approximately two volts, (h) a diode, having a voltage drop of less than one volt when conducting, connected between the tap of the first voltage divider and the junction of the first resistor and first zener diode for conducting only when the potential at the junction exceeds the potential at the tap by an amount exceeding the voltage drop in the diode and whereby when the positive supply voltage exceeds the normal level by approximately two volts, the potential of said tap is sufficiently high to saturate said transistor, (i) overvoltage responsive means for the supply voltage of negative polarity including a fourth resistance connected at one end to the positive terminal and a fourth zener diode, having a voltage rating on the order of two volts more than the normal level of supply voltage on the negative terminal, connected between the other end of the fourth resistance and the negative terminal for holding the junction between the fourth resistance and the fourth zener diode at a constant potential difference in the positive direction relative to the supply voltage in the negative terminal, (j) a third voltage divider connected across the fourth zener diode and having a tap which is less than two volts positive when normal supply voltages are on the supply voltage terminals, (k) a PNP transistor having its emitter connected to the reference terminal, its base connected to the tap on the third voltage divider, and its collector connected to a tap intermediate the ends of the third resistance, (l) a second diode having a voltage drop of less than one volt when conducting, connected between the tap of the third voltage divider and the junction of the fourth resistance and fourth zener diode for conducting only when the potential at the tap exceeds the potential at the junction by an amount exceeding the voltage drop in the diode, and whereby when the positive supply voltage is less than the normal level by approximately two volts, or the negative supply voltage is greater than the normal level by approximately two volts, both transistors are saturated, (m) and means coupled to another voltage tap between the ends of the second voltage divider operable in response to saturation of the first transistor.

References Cited by the Examiner
UNITED STATES PATENTS

| 2,959,717 | 11/1960 | Conger | 317—33 X |
| 3,094,647 | 6/1963 | Ferrin | 317—31 |
| 3,239,718 | 3/1966 | Fegley | 317—32 |

NEIL C. READ, *Primary Examiner.*

D. MYER, *Assistant Examiner.*